United States Patent [19]

Mangels et al.

[11] 4,377,542

[45] Mar. 22, 1983

[54] METHOD OF FORMING A DENSIFIED SILICON NITRIDE ARTICLE

[75] Inventors: John A. Mangels, Flat Rock; John R. Baer, Ypsilanti, both of Mich.

[73] Assignee: Ford Motor Company, Dearborn, Mich.

[21] Appl. No.: 333,243

[22] Filed: Dec. 21, 1981

[51] Int. Cl.$^3$ ............................................. C04B 35/58
[52] U.S. Cl. ..................................... 264/65; 264/332; 501/98
[58] Field of Search ..................... 264/65, 332; 501/98

[56] References Cited

U.S. PATENT DOCUMENTS

| | | | |
|---|---|---|---|
| 4,102,698 | 7/1978 | Lange | 264/65 |
| 4,143,107 | 3/1979 | Ishii | 264/65 |
| 4,179,486 | 12/1979 | Lange | 264/65 |
| 4,209,478 | 6/1980 | Wooten et al. | 264/65 |
| 4,264,546 | 4/1981 | Becker | 264/65 |
| 4,280,973 | 7/1981 | Moskowitz | 264/65 |
| 4,285,895 | 8/1981 | Mangels et al. | 264/65 |
| 4,351,787 | 9/1982 | Martinengo et al. | 264/65 |
| 4,354,990 | 10/1982 | Martinengo et al. | 264/65 |

*Primary Examiner*—James H. Derrington

*Attorney, Agent, or Firm*—William E. Johnson; Olin B. Johnson

[57] ABSTRACT

A method is disclosed in this specification for forming a densified silicon nitride article. The method is initiated by forming a reaction bonded article of moderate density. This moderate density reaction bonded article has a primary phase of substantially pure grains of silicon nitride surrounded by a secondary grain boundary phase. The secondary grain boundary phase contains silicon nitride, silicon dioxide and a densification aid incorporated in the reaction bonded article of moderate density. The compounds forming the secondary grain boundary phase are present either in their pure forms or interacted with one another. The reaction bonded article is packed in a packing powder which contains portions of the pure compounds found in or interacted with one another to define the secondary grain boundary phase. The reaction bonded article of moderate density is heated in the packing powder to a temperature and for a time whereby interaction of the secondary grain boundary phase and the packing powder may take place. The interaction takes place so that a new grain boundary phase can be developed about the substantially pure grains of silicon nitride. The new grain boundary phase developed is a unitary phase of a selected composition.

2 Claims, No Drawings

METHOD OF FORMING A DENSIFIED SILICON NITRIDE ARTICLE

The invention herein described was made in the course of or under a contract or subcontract thereunder (or grant) with the National Aeronautics and Space Administration, Contract #DEN3-167, Subcontract #P-1928150.

TECHNICAL FIELD

This invention is generally directed to a method of forming a densified silicon nitride article and more particularly to forming a densified silicon nitride article in which substantially pure grains of silicon nitride are surrounded by a grain boundary phase which is a unitary phase of a selected composition. Such a material is stable under oxidizing conditions at an elevated temperature of operation.

Such thermally stable silicon nitride ceramic articles may find a variety of uses, for example, in fabrication of various components of a gas turbine engine. Components which may be fabricated from silicon nitride include not only the rotor and stator for such turbines but also shrouds and liners for such engines.

BACKGROUND ART AND PRIOR ART STATEMENT

No search was conducted on the subject matter of this specification in the U.S. Patent and Trademark Office or in any other search facility.

The most relevant prior art of which we are aware is U.S. Pat. No. 4,102,698, issued July 25, 1978 to Lange et al. This patent is for silicon nitride compositions in the $Si_3N_4/SiO_2/Y_2O_3$ system. The patent discusses the ternary phase diagram of the $Si_3N_4, SiO_2$ and $Y_2O_3$ system. The patent teaches that within that system there is a so-called stable range of compositions for materials and an unstable range for certain compositions of such materials. By unstable, it is meant that a material will oxidize and degrade at 1000° C. under oxidizing conditions. If a material is stable, it does not oxidize under oxidizing conditions at 1000° C.

W. D. Caruthers, in "3500-Hour Durability Testing of Ceramic Materials" NASA Contract DEN 3-27, Third Progress Report, December, 1978, observed that the $Si_3N_4/Y_2O_3$ components defined as unstable by Lange are unstable in the temperature range of 700°–1000° C.

In a general sense, degradation of the material will result in strength losses after oxidation exposures. This is the ultimate test for a material. A stable material will have low oxidation weight gains but, more importantly, will exhibit little or no strength losses after oxidation exposure.

Normally, the materials discussed in the Lange patent are materials in which generally individual pure grains of silicon nitride have grain boundaries formed of mixtures of silicon nitride, silicon dioxide and yttrium oxide. The yttrium oxide is introduced into these materials as a sintering aid and is usually present in the range of 3–10 mole percent. The silicon dioxide is introduced into these materials as an impurity and remains as silicon dioxide no matter how carefully the silicon nitride powder is prepared.

In our co-pending application entitled "Thermally Stable Silicon Nitride Material", filed on the same date as this application as Ser. No. 332,918, we disclosed that we can make thermally stable ceramic materials even though the material in the grain boundary falls into materials classified by the Lange patent as being unstable. We have found further that we can make thermally stable materials if the secondary phase forming the grain boundries is a substantially pure material rather than a mixture of various materials.

This specification discloses and claims methods for ensuring that the secondary phase forming the grain boundaries is a substantially pure material of a selected composition. The methodology taught in this specification is not in any manner disclosed or discussed in the two above-mentioned pieces of prior art. We are unaware of any prior art which is relevant to the method disclosed and claimed in this specification.

DISCLOSURE OF THE INVENTION

This invention releates to a method of forming a densified silicon nitride article and more particularly to a method of forming a densified silicon nitride article in which a grain boundary phase is developed about substantially pure grains of silicon nitride, the grain boundary phase being a unitary phase of a selected composition.

In accordance with the teachings of the method of this invention, a densified silicon nitride article is formed in the following manner. A reaction bonded article of moderate density is originally formed. This reaction bonded article has a primary phase of substantially pure grains of silicon nitride surrounded by a secondary grain boundary phase which contains silicon nitride, silicon dioxide and a densification aid incorporated in the reaction bonded article of moderate density, the three compounds being found in either pure form or interacted one compound with another. The reaction bonded silicon nitride article of moderate density is packed in a packing powder which contains portions of the pure compounds found in the secondary grain boundary phase.

The reaction bonded silicon nitride article of moderate density packed in the packing powder is heated. The article is heated to a temperature and for a time whereby interaction of secondary grain boundary phase and the pure materials contained in the packing powder may take place so that a new grain boundary phase is developed about the substantially pure grains of silicon nitride. The new grain boundary phase developed is a unitary phase of a selected composition. The particular selected grain boundary phase composition is determined by the time and temperature of heating as well as the specific makeup of the packing powder.

A principal densification aid which may be used is yttrium oxide.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific examples.

The following description is what we consider to be preferred embodiments of the method of forming a densified silicon nitride article in accordance with the teachings of this specification. The following description also sets forth what we now contemplate to be the best mode of making densified silicon nitride articles in accordance with our method. This description is not intended to be a limitation upon the broader principles and teachings of this specification.

Also, for example, the method disclosed herein may be successfully used with materials yet to be developed by skilled artisans, such as new densification aids. It is therefore contemplated by us that the method disclosed in this specification may also be successfully used with materials which are yet to be developed because the principles of operation of the method remain the same, regardless of the particular materials subjected to the method or used with the method.

Prior to setting forth specific examples of the application of the method of this invention, the following generalized discussion is set forth for the the purpose of instructing persons skilled in the art with respect to the method of this invention.

In U.S. Pat. No. 4,285,895 issued Aug. 25, 1981 to Mangels et al, a method of densifying a reaction bonded silicon nitride article was disclosed. In that method a densification aid was incorporated into a reaction bonded silicon nitride article. The so-made article was then enclosed in a chamber which also contained a mixture of silicon nitride powder and powder the same as the densification aid incorporated into the silicon nitride article. The article and the powder mixture were heated in a nitrogen gas environment to a temperature above 1700° C. for a time sufficient to permit sintering of that article, whereby the strength of the reaction bonded article was increased. The patent noted that the densification aid can be selected from the group of materials consisting of magnesium oxide, yttrium oxide, cerium oxide and zirconium oxide.

The differentiation between that prior method and the method of this invention is that there is now included in the packing powder silicon dioxide as that compound is found in one form or another in the secondary grain boundary phase which surrounds the substantially pure grains of silicon nitride in the reaction bonded article. Also, the packing powder is kept in close association with the reaction bonded silicon nitride article so that compounds may diffuse between the packing powder and the secondary grain boundary phase in directions which depend upon the temperature of reaction, the time of reaction and the concentration of the $SiO_2$.

The earlier Mangels patent did not have any teachings relative to the fact that by selecting the constituents of the packing powder and heating that powder for selected periods of time at selected temperature the composition of the intergrannular phase can be altered and controlled. The desired intergrannular or secondary phases selected are single phases such as discussed in our previously mentioned co-pending application. Examples of these phases have been identified in our co-pending application as the so-called J phase, so-called K phase and the so-called H phase.

The exact composition developed as the unitary secondary phase depends on the thermodynamics of the entire system. One of the relevant factors is the percent composition makeup of the packing powder, that is, the relative proportions of silicon nitride to silicon dioxide to densification aid. As the $SiO_2$ content of the packing powder increases, the intergrannular phase or secondary phase composition will tend towards the $SiO_2$ corner of the $SiO_2/Si_3N_4/Y_2O_3$ diagram. Other important parameters are, of course, the temperature or temperatures to which the system is heated as well as the times of duration of the heating operations. This will become more apparent by review of the following examples.

EXAMPLE 1

Reaction bonded silicon nitride test bodies, i.e., rectangular bars $\frac{1}{4}''\times 1''\times 1''$ were made by slip casting a composition containing 88% of silicon metal particles and 12% of yttrium oxide densification aid into a suitable mold. The so-formed test bars were then subjected to a nitriding operation which is carried out at temperatures up to 1400° C. under a nitrogen pressure of 0.02 MPa for 150-300 hours. The test bodies so made are reaction sintered silicon nitride bodies having a moderate density of approximately 85-86% of theoretical. During nitriding, the following reaction occurs: $Si+Y_2O_3+N_2 \rightarrow Si_3N_4+Y_{10}Si_7O_{23}N_4$ (H phase). H phase is the densification aid.

The test bodies made in this manner are then packed in a packing powder having the composition 66% by weight silicon nitride, 9% by weight yttrium oxide and 25% by weight boron nitride. The packing powder contained no silicon dioxide.

The boron nitride is added to the packing powder to prevent the packing powder itself from sintering into a solid mass, which would make removal of the sintered part very difficult. Boron nitride is inert in this system and is simply an inert filler which physically prevents the packing powder from sintering into a hard, solid mass.

The sintering cycle for this material included a first stage of four hours at 1900° C. and 0.206 MPa of nitrogen atmosphere and a second stage of two hours at 1925° C.-1950° C. at 2.06 MPa pressure of nitrogen. This produced test bodies of a sintered silicon nitride material in which the primary phase was substantially pure grains of silicon nitride separated by a secondary phase which contained both the so-called J phase and the K phase of the ternary diagram of silicon nitride, silicon dioxide and yttrium oxide. The J phase is $Si_3N_4/SiO_2/4Y_2O_3$, and the K phase is $Si_3N_4/SiO_2/2Y_2O_3$.

The oxidation resistance of this mixed phase material at 1000° C. is poor. The percent weight change is up to 0.6 mg/cm$^2$ at approximately 50 hours exposure and slowly climbs up from this point upon further exposure. This material does not have a good oxidation resistance and it confirms what was stated in the Lange U.S. Pat. No. 4,102,698.

The mixed J and K material was found to exhibit severe strength reductions after the above oxidation exposures. After 300 hours exposure at 1000° C., a 91.8% strength loss was noted.

EXAMPLE 2

Reaction bonded silicon nitride test bodies were made according to the procedure described in Example 1. The test bodies were then packed in a packing powder having a composition 10 weight percent $SiO_2$, 9 weight percent $Y_2O_3$, 25 weight percent BN and the balance being $Si_3N_4$. The sintering cycle is 1900° C. for four hours at 0.206 MPa of nitrogen followed by two hours at 1950° C. and 2.06 MPa of nitrogen. The material produced using this procedure consists of silicon nitride with a secondary phase consisting of a mixture of H phase, $Si_3N_4/4SiO_2/5Y_2O_3$, and yttrium silicate, $Y_2Si_2O_5$.

The oxidation behavior of this material is linear and after 700 hours exhibits 0.2 mg/cm$^2$ weight change.

This lower weight change could possibly be predicted from Lange's patent. However, this material also exhibits a severe strength degradation of 69% after 700 hours exposure, suggesting that the material is unstable under oxidizing conditions, even though the weight change is relatively low.

We have, however, discovered that if the secondary phase is not a mixed phase but is in fact either substantially pure J phase, substantially pure K phase, or substantially pure H phase, the material has a much improved oxidation resistance. This will be demonstrated by the following examples.

EXAMPLE 3

The procedure of Example 2 is repeated to produce a material which is essentially $Si_3N_4$ plus a secondary phase of the $Y_2Si_2O_7$ composition. In this example, the packing powder composition was 15 weight percent $SiO_2$, 9 weight percent $Y_2O_3$, 25 weight percent BN and the balance, 51 weight percent, being silicon nitride. The sintering conditions were fours hours at 1900° C. and 0.206 MPa of nitrogen pressure followed by two hours at 1950° C. and 2.06 MPa of nitrogen.

The oxidation behavior of this material at 700° C. is such that the oxidation weight gain is low, 0.1 mg/cm$^2$ after 700 hours. This material exhibited a 4.7% strength increase after 700 hours of oxidation. This demonstrates the good stability of this material.

EXAMPLE 4

The procedure of Example 2 is repeated to produce a material which is essentially $Si_3N_4$ plus a secondary phase of the H composition. In this example, the packing powder composition was 5 weight percent $SiO_2$, 9 weight percent $Y_2O_3$, 25 weight percent BN and the balance 61 weight percent, being silicon nitride. The sintering conditions were four hours at 1900° C. and 0.206 MPa of nitrogen pressure followed by two hours at 1950° C. and 2.06 MPa of nitrogen.

The oxidation behavior of this material at 700° C. is such that the oxidation weight gain is low, 0.1 mg/cm$^2$ after 700 hours. This material exhibited a 4.7% strength increase after 700 hours of oxidation. This demonstrates the good stability of this material.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of forming a densified silicon nitride article which comprises:

forming a reaction bonded article of moderate density, said reaction bonded article having a primary phase of substantially pure grains of silicon nitride surrounded by a secondary grain boundary phase which contains silicon nitride, silicon dioxide and a yttrium oxide densification aid incorporated in the reaction bonded article of moderate density either in their pure forms or interacted with one another;

packing said reaction bonded silicon nitride article of moderate density in a packing powder which contains 15 weight percent $SiO_2$, 9 weight percent $Y_2O_3$, 25 weight percent BN and 51 weight percent silicon nitride; and heating said reaction bonded article of moderate density in said packing powder in a nitrogen pressure of 0.206 MPa for four hours at 1900° C. and in a nitrogen pressure of 2.06 MPa for two hours at 1950° C., whereby interaction of said secondary grain boundary phase may take place with the pure compounds contained in said packing powder whereby a new grain boundary phase is developed about the substantially pure grains of silicon nitride, which new grain boundary phase is a unitary phase of $Y_2Si_2O_7$.

2. A method of forming a densified silicon nitride article which comprises:

forming a reaction bonded article of moderate density, said reaction bonded article having a primary phase of substantially pure grains of silicon nitride surrounded by a secondary grain boundary phase which contains silicon nitride, silicon dioxide and a yttrium oxide densification and incorporated in the reaction bonded article of moderate density either in their pure forms or interacted with one another;

packing said reaction bonded silicon nitride article of moderate density in a packing powder which contains 5 weight percent $SiO_2$, 9 weight percent $Y_2O_3$, 25 weight percent BN and 61 weight percent silicon nitride; and heating said reaction bonded article of moderate density in said packing powder in a nitrogen pressure of 0.206 MPa for hour hours at 1900° C. and in a nitrogen pressure of 2.06 MPa for two hours at 1950° C., whereby interaction of said secondary grain boundary phase may take place with the pure compounds contained in said packing powder whereby a new grain boundary phase is developed about the substantially pure grains of silicon nitride, which new grain boundary phase is a unitary phase of H phase composition $Si_3N_4/4SiO_2/5Y_2O_3$.

* * * * *